C. P. FREY AND F. WAGNER.
COMPENSATING DEVICE FOR MEASURING INSTRUMENTS.
APPLICATION FILED APR. 3, 1920.
1,363,964.
Patented Dec. 28, 1920.
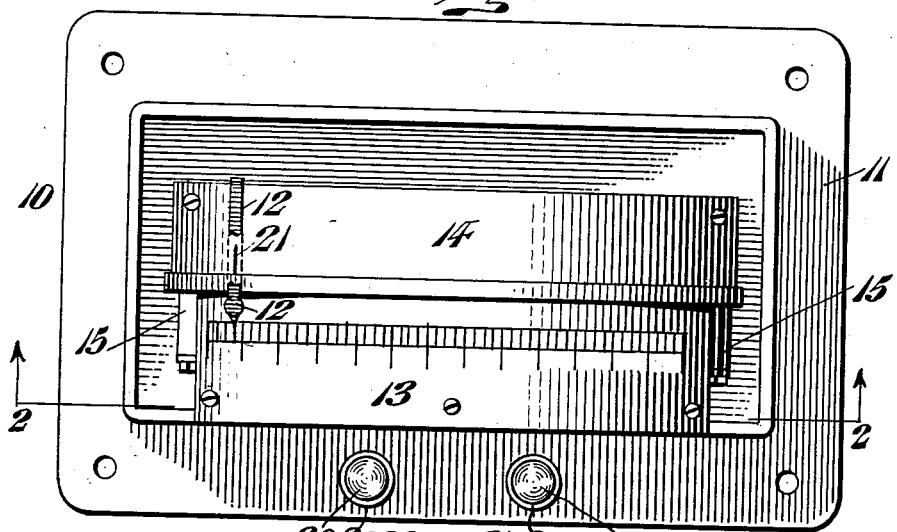
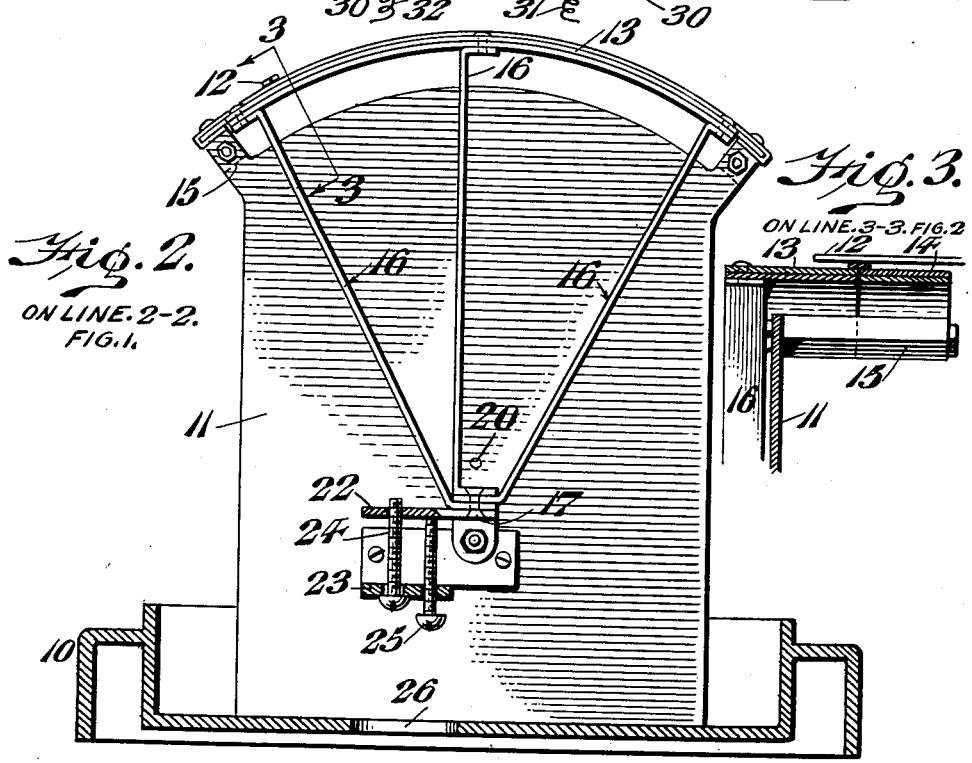

UNITED STATES PATENT OFFICE.

CHARLES P. FREY AND FRITZ WAGNER, OF PHILADELPHIA, PENNSYLVANIA.

COMPENSATING DEVICE FOR MEASURING INSTRUMENTS.

1,363,964.   Specification of Letters Patent.   Patented Dec. 28, 1920.

Application filed April 3, 1920. Serial No. 371,111.

*To all whom it may concern:*

Be it known that we, CHARLES P. FREY and FRITZ WAGNER, citizens of the United States, and residents of Philadelphia, county of Philadelphia, and State of Pennsylvania, and whose post-office addresses are Wayne Junction, Philadelphia, Pennsylvania, have invented certain new and useful Improvements in Compensating Devices for Measuring Instruments, of which the following is a specification.

Some of the objects of the present invention are to provide means for compensating a measuring instrument for temperatures surrounding the instrument; to provide means automatically operative for compensating an electrical measuring instrument for changes in temperature of the cold-junction of a thermo-couple which is connected to the instrument; to provide means for correcting an instrument for any temperature coefficient; to provide means by which the indicating pointer of a temperature measuring instrument can be set to zero; to provide a two-part scale for measuring instruments having a movable scale element automatically adjustable to correspond to temperature changes; to provide means for calibrating a measuring instrument; and to provide other improvements as will hereinafter appear.

In the accompanying drawings Figure 1 represents a front elevation of a measuring instrument embodying one form of the present invention, the cover being removed for illustration; Fig. 2 represents a section on line 2—2 of Fig. 1; and Fig. 3 represents a section on line 3—3 of Fig. 2.

Referring to the drawings a temperature measuring instrument 10 of any well known type is shown mounted upon a suitable base 11, and having a pointer 12 arranged to be actuated in the usual manner for indicating purposes. In the present instance the instrument 10 is electrically operated by a current produced by the difference in temperature between the hot-junction and the cold-junction of a thermo-couple, this current varying in accordance with changes in temperature of either junction, though it will be understood that in the operation of the thermo-couple it is the hot-junction which is subjected to temperature change while the cold-junction is maintained as nearly as possible at a constant temperature. The pointer 12 is arranged to swing across the face of a scale 13 having temperature graduations in degrees thereon whereby the temperature desired can be read from the rest position of the pointer 12. It will be understood that the pointer 12 is arranged for adjustment to zero and can be set to any actual cold-junction temperature desired, such adjustment means however form no part of the present invention being well known in the art and any device suitable for the purpose can be employed.

As a means for compensating the instrument for changes in temperature of the cold-junction of the thermo-couple, the scale 13, in the present construction, is movable with respect to a plate, card or any other suitable part 14 fixed to spaced posts 15 rigid with the instrument proper and serving the usual purpose of scale supports. Both of the scale parts 13 and 14 are suitably curved concentric with the arc of travel of the pointer 12. The scale 13 is carried by a plurality of strips 16 of thermostatic material which are rigidly fixed to a common support, in the form of a bracket 17 secured to a fixed part of the instrument and located in close proximity to the axis 20 of the pointer 12. These strips 16 are formed of what is commonly known as thermostatic metal, that is a metal strip comprising two strips of different metals having different coefficients of expansion. The two metals are bonded together in the process of manufacture in such a manner as to form a unitary metal strip, which to the eye does not show any distinct line or indication of two metals. With a variation of temperature, one of the metals expands or contracts more than the other, so that the strip as a whole is caused to swing in one direction or the other about its fixed end. Thus an increase in the temperature of the cold-junction causes the strip 16 to move the scale 13 in a direction to increase the reading of the scale 13 with respect to the normal zero by the number of degrees corresponding to the increase in temperature, while a decrease in temperature causes the strips 16 to move the scale 13 in the opposite direction so that the reading of the scale 13 is decreased with respect to the normal zero by the number of degrees drop in temperature. The reading of the pointer 12 therefore remains the true indication of the temperature at the distant point, namely the temperature of the hot-junction of the thermo-couple.

In order to provide means for setting the pointer 12 to zero, a mark 21, or any other indicating means, is located on the fixed scale part 14 at a predetermined zero point, and this generally corresponds to the normal cold-junction temperature. In the present instance this point 21 is taken as 75° F., and the pointer 12 is adjusted thereto. The provision of this fixed zero is a very essential feature of the instrument because without such a means it is impossible to determine whether the index pointer 12 and the movable scale 13 are in proper relation to indicate a true reading. The movable scale must be calibrated accurately to this fixed zero initially and therefore any variation of the scale 13, or the pointer 12, can be instantly detected and correction made.

For calibrating the scale 13 to this selected zero, the bracket 17 is provided with a lateral extension 22 which is spaced from a lug 23 rigidly secured to a fixed part of the instrument. This lug 23 receives an adjusting screw 24 which is threaded into the extension 22, while a set screw 25 is threaded through the lug 23 and bears against a face of the extension 22. Thus by releasing the set screw 25 the screw 24 can be turned as desired to deflect the strips 16 in the manner necessary to bring the normal indicia in alinement with the normal mark 21 on the fixed part 14. An opening 26 is provided in the base 11 opposite to the location of the screws 24 and 25 so that adjustment can be readily made from the exterior of the instrument. It will be understood that the adjusting means shown is only by way of example and that any other suitable means may be employed.

For connecting the instrument to the thermo-couple any suitable form of binding posts 30 may be employed and to these may be secured the respective wires 31 and 32 of the thermo-couple, or leads of similar material to the thermo-couple, or compensating leads of different metal or alloys from the thermo-couple, or any other suitable means which will extend the cold-junction to the instrument may be provided to bring the cold ends within the temperature zone of the instrument.

From the foregoing it will be apparent that when the pointer 12 is set to the predetermined normal zero and the movable scale 13 calibrated in accordance with this zero, the instrument is then self compensating for changes in the cold-junction temperature, or variations in the temperature surrounding the instrument. Thus in the present instance if the cold-junction temperature rises above 75° F., then the scale 13 will be automatically shifted to read 1° high with respect to the set zero for every degree rise in temperature, and correspondingly the scale 13 will be shifted to read 1° low with respect to the set zero for every drop in temperature. The compensation takes place automatically and the reading of the pointer 12 is the true temperature of the hot-junction at the distant point. In case the pointer shifts from its normal set zero due to temperature changes, spring fatigue, or any other cause, its variation is at once apparent when no current is flowing and the pointer 12 can be immediately set to zero so that the instrument is in condition for true readings.

Furthermore it will be evident that the temperature coefficient of the instrument or meter is likewise automatically compensated and the indications of the pointer 12 will be correct at all times in that they bear a true relation to the temperature of the hot-junction of the thermo-couple.

While but one of the many forms in which this invention may be embodied have been here shown, it is to be understood that the invention is not limited to any specific construction but might be applied in various forms without departing from the spirit of the invention or the scope of the appended claims.

Having thus fully described our invention, we claim:—

1. In an electrical instrument, a pointer, a scale operatively arranged with respect to said pointer, means to automatically compensate said scale for changes of temperature surrounding said instrument, and means for establishing a normal zero, whereby said pointer can be set to zero.

2. In an electrical instrument, a pointer, a scale graduated in temperature or temperature equivalents and operatively arranged with respect to said pointer, means to automatically compensate said scale for changes of temperature surrounding said instrument, and means for establishing a normal zero, whereby said pointer can be set to zero.

3. In an electrical instrument, a pointer arranged to move in response to temperature changes in a thermo-couple, a scale operatively mounted with respect to said pointer, means including a thermostat for mounting said scale to move relative to said pointer, and fixed means for indicating a predetermined zero to which said pointer is set.

4. In an electrical instrument, a pointer arranged to move in response to distant temperature changes in a thermo-couple, a scale operatively mounted with respect to said pointer, means for automatically compensating said scale for changes in temperature surrounding said instrument, and fixed means for indicating a predetermined zero to which said pointer is set.

5. In an electrical instrument, a pointer arranged to move in response to distant temperature changes in a thermo-couple, a scale operatively mounted with respect to said pointer, a fixed means for indicating a predetermined zero to which said pointer is set, and means responsive to changes of temperature surrounding said instrument for moving said scale relatively to said fixed zero proportionately to changes of temperature surrounding said instrument, whereby said instrument is automatically compensated.

6. In an electrical instrument, a pointer arranged to move in response to distant temperature changes in a thermo-couple, a scale operatively mounted with respect to said pointer, a fixed means for indicating a predetermined zero to which said pointer is set, and means responsive to changes of temperature surrounding said instrument for moving said scale relative to said fixed zero to always give a true reading of the distant temperature.

7. In an electrical instrument, a two part scale, one of said parts being movable and the other part fixed, said fixed part having a zero indication thereon and said movable part having a plurality of graduations representing temperature or temperature equivalent, a pointer, and means controlled by the temperature of the cold-junction of a thermo-couple for causing said graduated scale to move relative to said fixed zero in a manner to give a true reading of the temperature of the hot-junction of said thermo-couple.

8. In an electrical instrument, a two part scale, one of said parts having a zero indication and the other part having a plurality of graduations, a pointer, means for mounting one of said scale parts for movement relative to the other scale part, and means controlled by the temperature of the cold-junction of a thermo-couple for causing said movable means to shift said scale part to compensate the reading of said pointer for changes in the temperature of the cold-junction of said thermo-couple.

9. In an electrical instrument, a pointer arranged to move in response to distant temperature changes in a thermo-couple, a scale arranged in operative relation to said pointer, a fixed means for indicating a predetermined zero to which said pointer is set, and a plurality of thermostatic strips supporting said scale, whereby said scale is compensated for changes in the temperature of the cold-junction of said thermo-couple or in the temperature surrounding said instrument.

Signed at Philadelphia, in the county of Philadelphia and State of Pennsylvania, this 31st day of March, 1920.

CHARLES P. FREY.
FRITZ WAGNER.